United States Patent
Okubo et al.

(10) Patent No.: US 8,417,431 B2
(45) Date of Patent: Apr. 9, 2013

(54) METHOD FOR REDUCING GEAR RATTLE IN A HYBRID ELECTRIC VEHICLE POWERTRAIN

(75) Inventors: Carol Louise Okubo, Belleville, MI (US); David Jason Mack, Plymouth, MI (US); Melinda A. Mack, legal representative, Plymouth, MI (US); Paul Stephen Bryan, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 547 days.

(21) Appl. No.: 12/507,406

(22) Filed: Jul. 22, 2009

(65) Prior Publication Data

US 2010/0023194 A1 Jan. 28, 2010

Related U.S. Application Data

(60) Provisional application No. 61/082,898, filed on Jul. 23, 2008.

(51) Int. Cl.
*G06F 19/00* (2006.01)
*G06G 7/70* (2006.01)

(52) U.S. Cl.
USPC ............... 701/99; 701/54; 701/101; 701/111; 180/65.265; 180/65.275; 180/65.28; 180/65.285; 903/905; 903/906; 903/930

(58) Field of Classification Search .................... 701/22, 701/51, 54, 99, 101, 111; 477/3, 111; 903/905, 903/906, 930; 180/65.275, 65.28, 65.285
See application file for complete search history.

(56) References Cited

U.S. PATENT DOCUMENTS

| | | | |
|---|---|---|---|
| RE34,159 E | 1/1993 | Harrington et al. | |
| 5,285,111 A | 2/1994 | Sherman | |
| 5,376,869 A | 12/1994 | Konrad | |
| 5,558,173 A | 9/1996 | Sherman | |
| 5,967,940 A | 10/1999 | Yamaguchi | |
| 6,616,569 B2 | 9/2003 | Hoang et al. | |
| 7,273,439 B2 * | 9/2007 | Kuang et al. | 477/3 |
| 8,167,064 B2 * | 5/2012 | Iwase et al. | 180/65.265 |
| 2008/0004780 A1 * | 1/2008 | Watanabe et al. | 701/54 |
| 2008/0227590 A1 * | 9/2008 | Kimura et al. | 477/3 |
| 2011/0185847 A1 * | 8/2011 | Tanba et al. | 74/661 |

* cited by examiner

*Primary Examiner* — Thomas Tarcza
*Assistant Examiner* — Rami Khatib
(74) *Attorney, Agent, or Firm* — David B. Kelley; Brooks Kushman P.C.

(57) ABSTRACT

A method for controlling a powertrain for a hybrid electric vehicle having an engine and a motor and gearing for establishing power flow paths from the engine and the motor with common gear elements to vehicle traction wheels. An engine power bias is applied to an engine power command and a bias to a motor torque command to avoid an operating mode in which motor torque is at or near zero, whereby gear rattle due to torque disturbances is avoided.

15 Claims, 3 Drawing Sheets

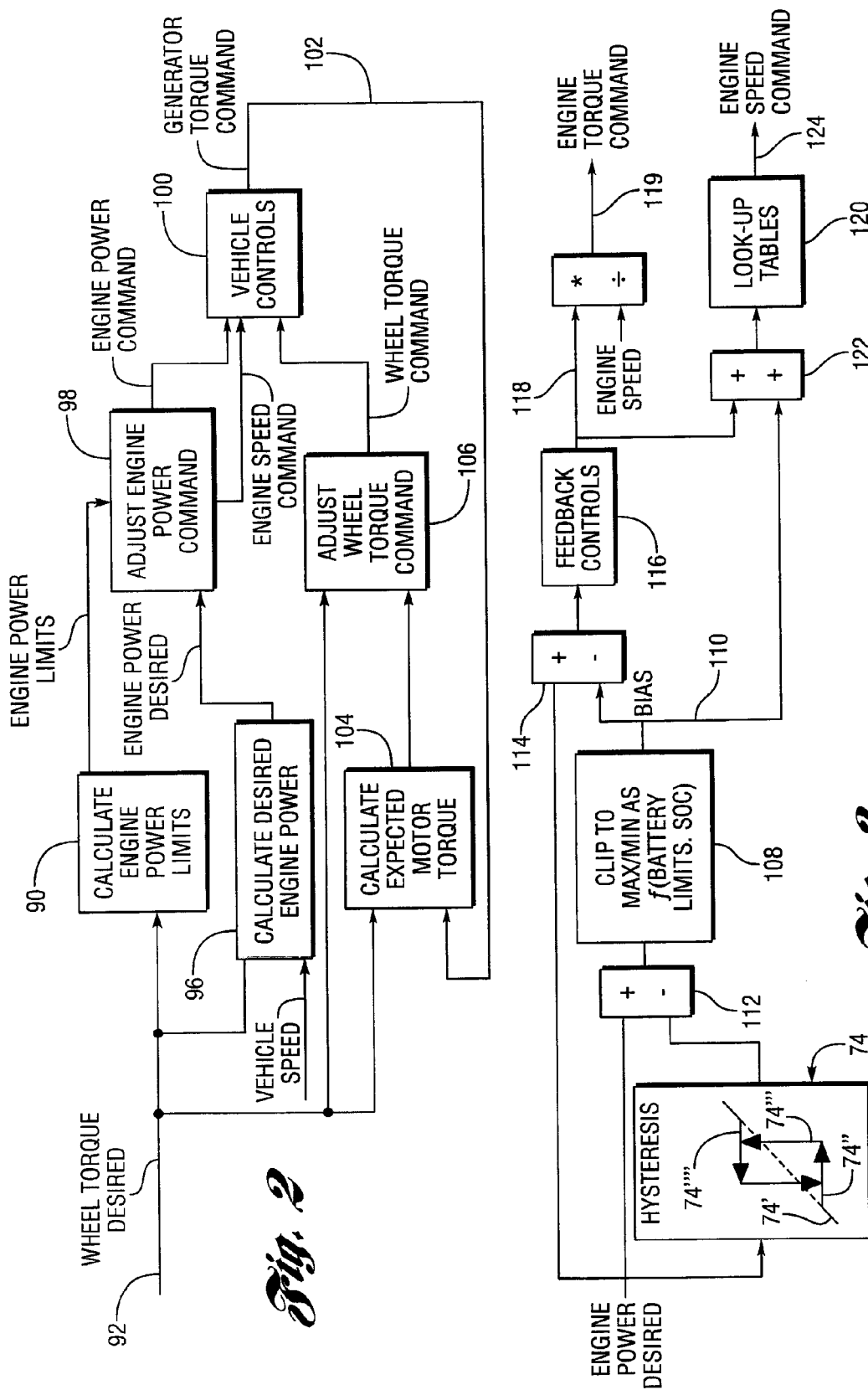

METHOD FOR REDUCING GEAR RATTLE IN A HYBRID ELECTRIC VEHICLE POWERTRAIN

CROSS-REFERENCE TO RELATED APPLICATIONS

This application claims the benefit of U.S. provisional application Ser. No. 61/082,898, filed Jul. 23, 2008.

BACKGROUND OF THE INVENTION

1. Field of the Invention

The invention relates to a hybrid electric vehicle powertrain and a method for avoiding a zero motor torque to attenuate torsional disturbances.

2. Background Art

A hybrid electric vehicle powertrain has two power sources comprising an engine and an electric traction motor in separate power flow paths. The power flow paths are defined by gearing, an output gear element being mechanically coupled to vehicle traction wheels. Typically, the power output element is connected through a drive shaft to a differential-and-axle assembly for the vehicle traction wheels. A powertrain of this type is disclosed, for example, in U.S. Pat. No. 7,273,439, which is assigned to the assignee of the present invention.

The powertrain disclosed in the '439 patent is a so-called power-split hybrid electric vehicle powertrain wherein an engine is drivably coupled to a torque input element of a planetary gear unit and a generator is coupled to a second element of the planetary gear unit. A third element of the planetary gear unit distributes torque to torque transfer gearing, which defines the torque flow path from both the motor and the engine as the two power sources drive the vehicle traction wheels.

A transmission controller is used to control generator speed, thereby effecting a division of engine power between the two power flow paths. This implies that the engine speed can be isolated from the vehicle speed, whereby the powertrain can function in a manner similar to the function of a continuously variable transmission where vehicle speed changes do not depend on engine speed changes. The engine and the motor, which is electrically coupled to the generator, function together seamlessly as they deliver torque through the gearing to the vehicle traction wheels.

The transmission controller may allow the motor torque to decrease to a zero value or a near-zero value as it controls torque delivery to the traction wheels in response to changing vehicle operating variables. If the motor torque becomes zero or approaches zero, torque pulsations from the engine due, for example, to engine combustion forces, may cause the unloaded motor and the gearing drivably connected to the motor to become subjected to torsional disturbances. These disturbances may cause what is commonly referred to as "gear rattle".

SUMMARY OF AN EMBODIMENT OF THE INVENTION

The present invention will avoid the previously described gear rattle condition, or reduce it substantially using control system software that will cause the powertrain to avoid situations in which the commanded engine torque and the commanded wheel torque result in zero motor torque or motor torque near zero. The invention uses a feed-forward and a feedback control strategy that avoids a zero motor torque condition during any given operating event. In executing the feed-forward strategy, a desired wheel torque and pre-calibrated torque limits are used. If desired engine power would cause these limits to be exceeded, the engine power then is commanded by the controller to increase or decrease engine power output. If the engine power is adjusted to a reduced level, the battery is commanded by the controller to provide power that will compensate for the decrease in engine power. If the engine power is adjusted upwardly by the controller, the battery can be charged to sink the adjusted power. The engine torque command is changed accordingly.

In the execution of a feedback strategy, motor torque is calculated based on a generator torque command and desired wheel torque. If that motor torque is within the precalibrated motor torque limits, the wheel torque command is adjusted away from the desired wheel torque.

According to another aspect of the invention, a feedback strategy is used in which a required motor torque is predicted based on a generator torque command and a desired wheel torque. A biased motor torque is calculated using a calibrated hysteresis map whereby the commanded wheel torque is adjusted by the motor torque bias. This will avoid the effect of delays in engine torque production and errors between commanded and actual engine torque, which may result in an instantaneous near-zero motor torque. It also avoids the effects of other transient events on an engine power command.

BRIEF DESCRIPTION OF THE DRAWINGS

FIG. 2 is a schematic block diagram of the feed-forward and feedback control strategy;

FIG. 3 is a block diagram illustrating the logic involved in the control strategy illustrated in FIG. 2;

PARTICULAR DESCRIPTION OF AN EMBODIMENT OF THE INVENTION

Figure 1:
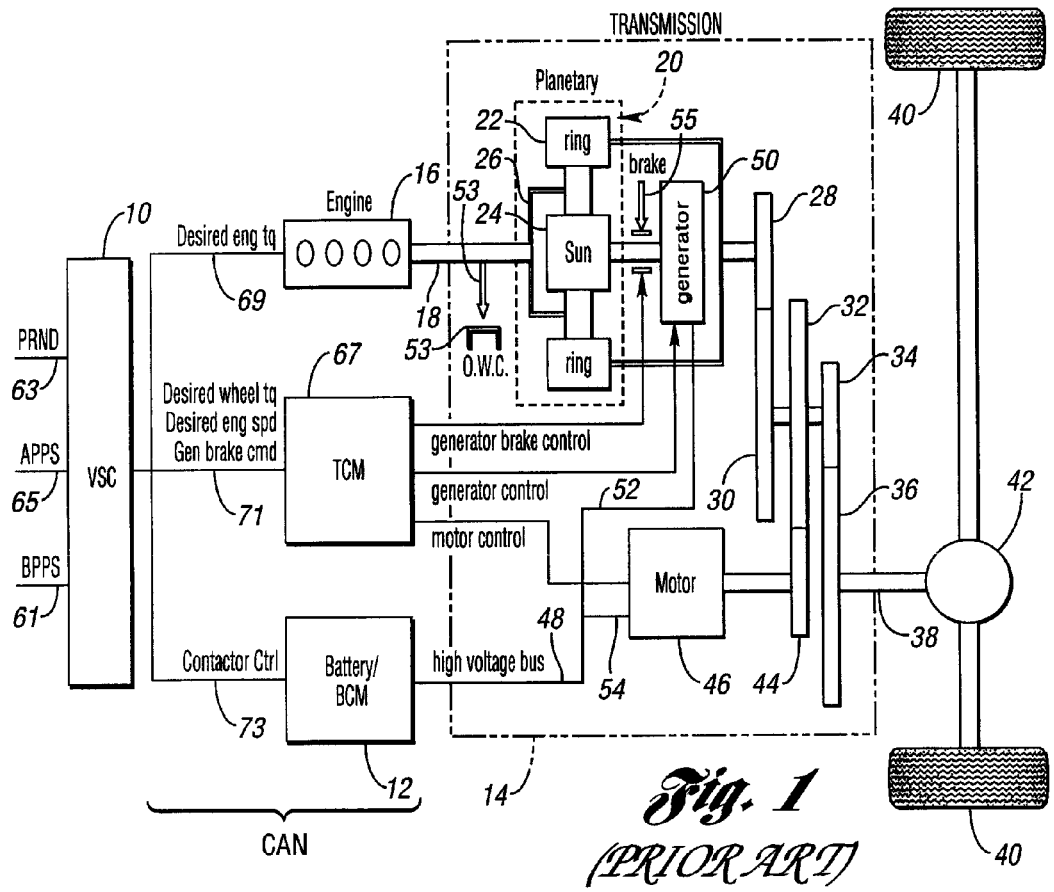
FIG. 1 illustrates in schematic form a power-split hybrid electric vehicle powertrain that is capable of embodying the present invention.

The hybrid electric vehicle powertrain of one embodiment of the invention has the configuration shown in FIG. 1. A vehicle system controller 10, a battery 12 and a transaxle 14, together with a motor-generator subsystem, comprise a control area network (CAN). An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery 12 delivers electric power to the motor through power flow path 48. Generator 50 is connected electrically to the battery and to the motor in known fashion, as shown at 52.

When the powertrain battery 12 is acting as a sole power source for the motor with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

The vehicle system controller 10 receives a signal from a transmission range selector 63, which is distributed to transmission control module 67, together with a desired wheel torque, a desired engine speed and a generator brake command, as shown at 71. A battery contactor or switch 73 is closed after vehicle "key-on" startup. The controller 10 issues a desired engine torque request to engine 16, as shown at 69, which is dependent on accelerator pedal position sensor output 65.

A brake pedal position sensor distributes a wheel brake signal to controller, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Figure 1A:
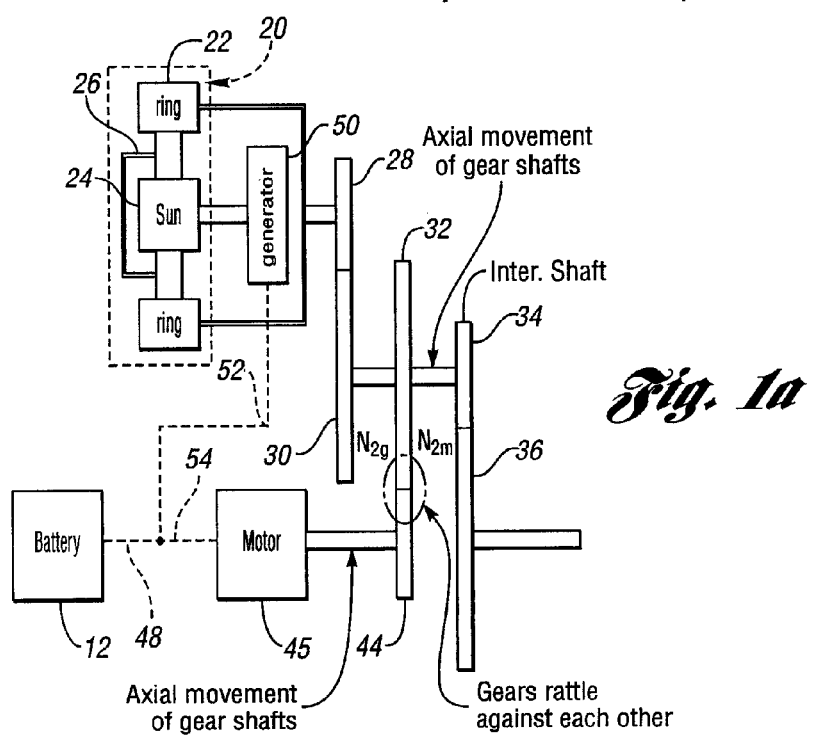
FIG. 1a is a simplified schematic representation of the powertrain of FIG. 1 wherein the elements that are involved in a gear rattle condition are identified.

In FIG. 1a, an instantaneous gear tooth speed at $N_{2g}$ in a geared torque flow path for the generator can differ from an instantaneous gear tooth speed $N_{2m}$ for gear 44, thereby causing gear rattle. The occurrences and severity of gear rattle may be reduced by using control system software to avoid situations in which the commanded engine torque and commanded wheel torque result in a motor torque near zero.

The relationship between the engine torque, motor torque and wheel torque is as follows:

$$Tq_{wheel} = K_{m2w} * (Tq_{motor} + K_{e2m} * Tq_{eng}),$$

where $k_{e2m}$ is the gear ratio between the engine and motor, $k_{m2w}$ is the gear ratio between the motor and the wheels, $Tq_{wheel}$ is wheel torque, $Tq_{motor}$ is motor torque, and $Tq_{eng}$ is engine torque.

A combination feed-forward and feedback strategy built around the above relationship is employed to avoid zero motor torque (see FIG. 2). First, in the feed-forward strategy, a region of engine power to be avoided is calculated based on the desired wheel torque and the motor torque limits. If the engine power request falls within this region, the commanded engine power is adjusted, up or down, using the battery to source or sink the difference. This adjusts the engine torque command. Next, in the feedback strategy, an expected motor torque is calculated based on the generator torque command. If the expected motor torque falls between the motor torque limits, the wheel torque command is adjusted away from the desired wheel torque.

As seen in FIG. 2, the engine power limits are calculated at 90, according to algorithms that will be described subsequently, using a desired wheel torque 92. The limit values are received by strategy action block 98. The action block 96, using measured vehicle speed, calculates desired engine power. Action block 98 computes an engine power command limited by the power limits at 90. The VSC uses that engine power command to compute a commanded engine torque, which is received by the vehicle controls (electronic throttle control) 100, by dividing engine power command by the current engine speed. Because of the characteristics of the power-split transmission of FIG. 1, engine speed is controlled by generator torque. Action block 98 in FIG. 2 calculates a commanded engine power, which is received by the vehicle controls 100. Vehicle controls 100, including the transmission controller 57, uses measured engine speed and commanded engine speed to obtain generator torque at 102.

The transmission controller, using desired torque at the wheels and generator torque as input, then determines torque of the motor at 104. That value is used at 106 to develop a wheel torque command used by the vehicle controls 100 to create feedback at 102.

Engine Power Biasing

Given the driver demanded wheel torque, and a region of motor torque to avoid, defined by $Tq_{mot}$, lower and $Tq_{mot}$, upper, a region of engine power to be avoided may be calculated as follows:

$$P_{eng}, \text{lower} = \omega_{eng} \cdot \frac{1}{k_{e2m}} \left( \frac{1}{k_{m2w}} Tq_{wheel} - Tq_{mot}, \text{upper} \right)$$

$$P_{eng}, \text{upper} = \omega_{eng} \cdot \frac{1}{k_{e2m}} \left( \frac{1}{k_{m2w}} Tq_{wheel} - Tq_{mot}, \text{lower} \right)$$

Figure 5:
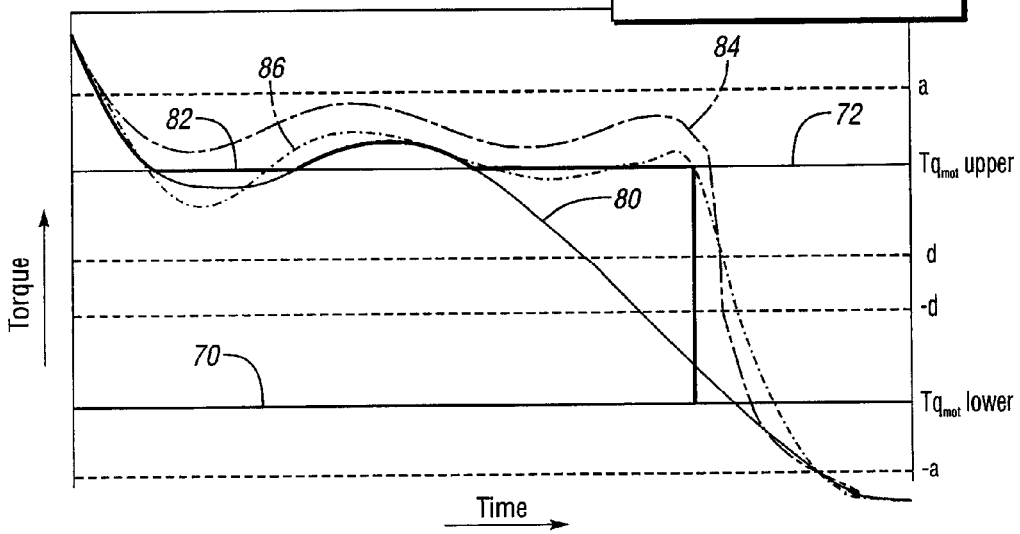
FIG. 5 is a time plot that shows the effect of engine power bias and wheel torque bias on actual motor torque.

The lower motor torque limit is shown at 70 in FIG. 5. The upper motor torque limit is shown at 72 in FIG. 5. The region to avoid is the region between limits 70 and 72 in FIG. 5.

Hysteresis logic is applied to the desired engine power if it lies within the region defined by the above equations, and the difference defines the desired engine power bias. This value is the amount of battery charge or discharge that will be required to adjust the engine power out of the zero motor torque region. The hysteresis logic is shown at 74 in FIG. 3. When the engine power desired changes according to the plot shown at 74', an increase will not occur beyond the value shown at 74". It then will continue changing as shown at 74''' as the zero or near-zero region illustrated by a dotted line is avoided. Likewise, when the engine power described changes in the opposite direction, the change will not continue beyond the value 74'''', thereby again avoiding the zero or near-zero motor torque region. The modification made to avoid the zero motor torque region is subtracted at 112 from desired engine power.

The biased desired engine power is clipped or limited at 108 to a maximum and minimum power as a calibratable function of the battery charge and discharge power limits and the battery state of charge, and combined with any other battery power requests (e.g. battery SOC maintenance). This modified desired engine power bias is shown at 110 in FIG. 3. These requests typically are included in the desired engine power before any applicable feedback controls.

The engine operating point is determined by the engine torque command shown at 119 in FIG. 3 and by engine speed command 124. Engine speed command 124 is developed at look up tables 120, where power command 118 is converted to speed.

The commanded engine torque is calculated by dividing the engine power command at 98 in FIG. 2 or at 118 in FIG. 3 by the current measured engine speed, thus adjusting the engine torque command away from the zero motor torque region. The engine speed is controlled by using generator torque developed by the vehicle controls 110 of FIG. 2. The feedback controls at 116 adjust desired engine power to compensate for actual engine torque produced. The controls at 116 are not related to generator speed control. The modified engine power bias at 110 in FIG. 3 is removed, as shown at 114 in FIG. 3, from the engine power at 118 prior to summing point 122 and prior to calculating the target engine speed at 120 to prevent unintuitive engine speed behavior. This prevents the engine power bias from creating a potentially unstable feedback loop with the engine power limit calculation (see above equations).

The control strategy where the logic specific to the engine power biasing is shown in FIG. 3 at 74, 108, 112 and 122.

Wheel Torque Biasing

Measured engine speed is used as an input to the transmission controller 67 in FIG. 1 to compute a generator torque. That variable, together with desired wheel torque, will determine motor torque. Wheel torque is equal to generator torque multiplied by gearing ratio plus motor torque multiplied by gearing ratio.

The engine power biasing aims to adjust the engine operating point such that the motor torque remains non-zero, given the desired wheel torque. However, the commanded motor torque may still be at, or near, zero under the following circumstances:

Engine torque response and accuracy: Delays in engine torque production and errors between commanded and actual engine torque may result in a motor torque near zero even when the commanded engine torque remains outside of the zero motor torque region.

Battery charge or discharge limitations: The calculated engine power bias may be clipped at 108 at low battery charge or discharge limits, that would result in a commanded engine torque within the zero motor torque region.

Feedback controls: The feedback controls 116 on the engine power command may adjust the engine power command into the zero motor torque region.

Zero motor torque traversals.

To address these situations, and to provide additional buffer away from zero motor torque, a feedback strategy is employed in which the required motor torque is predicted based on the generator torque command and the desired wheel torque. A biased motor torque is calculated using the hysteresis map shown in FIG. 4, and the commanded wheel torque is adjusted by the motor torque bias (biased motor torque −predicted motor torque), scaled by the appropriate gear ratio.

Figure 4:
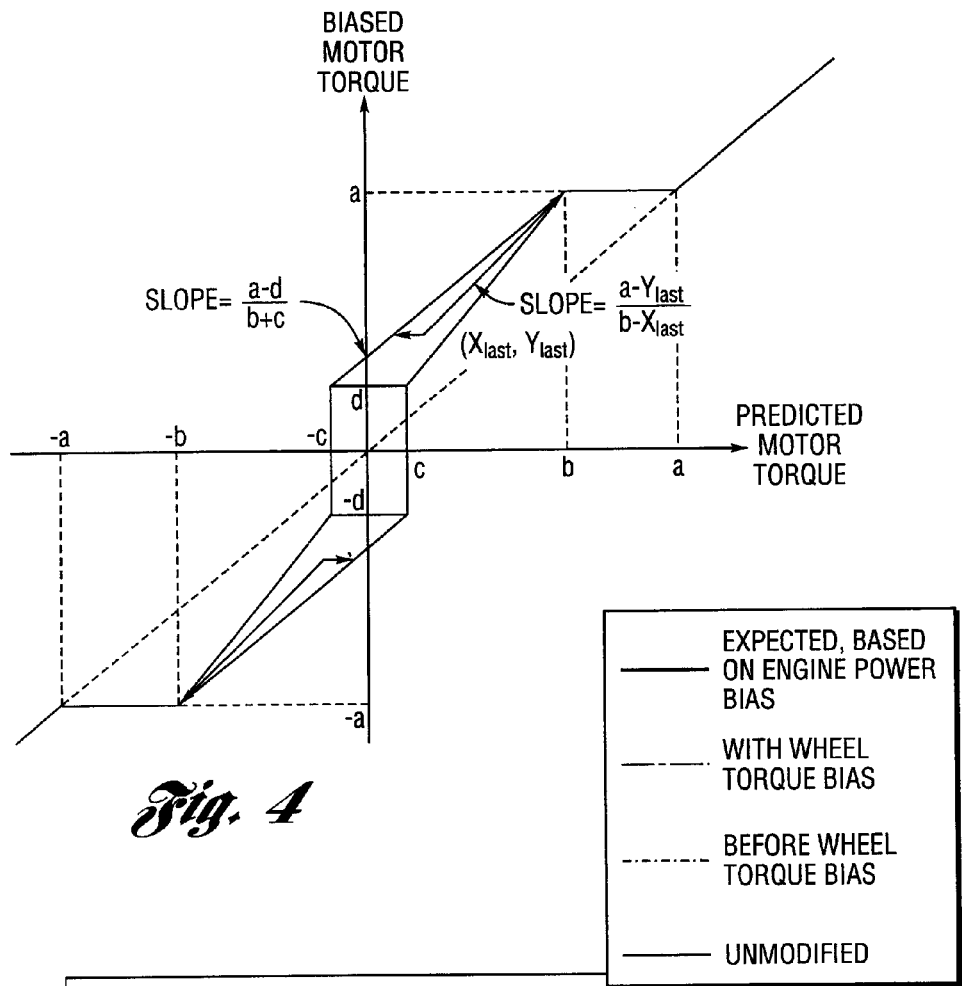
FIG. 4 shows a hysteresis map illustrating how motor torque bias is calculated and how the commanded wheel torque is adjusted by the motor torque bias.

On the upper side of the hysteresis map seen in FIG. 4, when the predicted motor torque is above point "a", there is no bias applied to the motor torque. Between "b" and "a" the biased motor torque is "a"; between "−c" and "b", if the predicted motor torque is decreasing, the biased motor torque is:

$$\min\left(y_{last}, \frac{a-d}{b+c}(x-b) + a\right);$$

and if the predicted motor torque is increasing, the biased motor torque is $$\frac{a - y_{last}}{b - x_{last}}(x - x_{last}) + y_{last}.$$

The subscript "last" refers to a corresponding coordinate in the previous control loop of the controller 10 in FIG. 1. The biased motor torque switches to the lower side when the predicted motor torque is less than −c. The lower side of the hysteresis map is similar to the upper side.

Combined Effect of Engine Power Bias and Wheel Torque Bias

FIG. 5 shows an example of how the engine power bias and wheel torque bias act together to minimize an occurrence of near-zero motor torque. Shown at 80 is the expected motor torque for a desired wheel torque, and for normal engine operation, without modification by the engine power biasing or wheel torque biasing. The expected motor torque hovers above zero for a time before traversing to the negative torque region.

When the engine power biasing is applied, the biased engine torque command would be expected to produce the motor torque shown at 82. The engine power hysteresis keeps the motor torque above $Tq_{mot}$,upper until the unmodified torque crosses the hysteresis switching point. Then the motor torque is kept below $Tq_{mot}$,lower.

Due to delays and inaccuracies in engine torque production, the actual motor torque command, in the absence of the wheel torque biasing, is shown by dotted line 86. This is the predicted motor torque used by the wheel torque biasing strategy.

The actual motor torque command, shown at 84, is the result of the wheel torque bias. The wheel torque bias shifts the motor torque farther away from zero than the engine power biasing alone. It compensates for engine torque adjustment using battery power when engine torque inaccuracy would have caused a zero motor torque. Further, it provides a faster traversal from positive motor torque to negative motor torque.

If an attempt were to be made to solve the gear rattle problem by keeping engine power constant by adjusting engine speed as needed after engine torque was adjusted out of a zero torque region, rather than by using the strategy of the present invention, which compensates for the engine torque adjustment using battery power, the speed adjustment and the rate of adjustment might be large enough to be perceived by the driver. The changes may occur independently of driver demand. Further, the strategy of the prevent invention is not affected by engine torque inaccuracy.

The present invention combines modifications to the engine torque command and to the wheel torque command, so that an over-all affect on the motor torque command may be significant while limiting the size of the individual corrections. This minimizes both the impact on fuel economy (caused by excess battery charge and discharge), and the driver's perception of the effects of execution of the strategy.

Due to inertia of the motor, pulsating engine torque tends to cause inertia forces at the motor that initiate torque disturbances under drive conditions when low motor torque occurs. The present invention will avoid such disturbances while simultaneously satisfying driver wheel torque demand.

The hysteresis map for the wheel torque bias maximizes the amount by which the motor torque is shifted away from zero, while minimizing the size of the step change in wheel torque that must occur when the motor torque switches from one side of the hysteresis to the other.

Although an embodiment of the invention has been disclosed, it will be apparent to persons skilled in the art that modifications may be made without departing from the scope of the invention.

What is claimed:

1. A method for avoiding gear rattle in a powertrain for a hybrid electric vehicle with an engine and an electric motor and with gearing defining power flow paths from the engine and from the motor to vehicle traction wheels, the method comprising:

establishing a desired engine power and a desired wheel torque;

determining an expected motor torque using the desired engine power and the desired wheel torque;

calculating an engine power bias corresponding to an expected motor torque of about zero; and controlling the engine using a controller using the engine power bias to avoid gear rattle associated with zero motor torque.

2. The method set forth in claim 1, wherein expected motor torque is modified by a motor torque bias based on a generator torque command and the desired wheel torque using a hysteresis strategy, the motor torque bias complementing the engine power bias to obtain a predicted motor torque based on a generator torque command and the expected wheel torque between a positive motor torque limit and a negative motor torque limit avoided.

3. The method set forth in claim 1, wherein a calibrated engine power region is defined between upper and lower engine power limits, whereby motor operation between corresponding upper and lower motor torque limits avoids development of a zero motor torque.

4. The method set forth in claim 3, wherein lower and upper engine power limits are defined as:

$$P_{eng}, \text{lower} = \omega_{eng} \cdot \frac{1}{k_{e2m}} \left( \frac{1}{k_{m2w}} Tq_{wheel} - Tq_{mot}, \text{upper} \right) \text{ and}$$

$$P_{eng}, \text{upper} = \omega_{eng} \cdot \frac{1}{k_{e2m}} \left( \frac{1}{k_{m2w}} Tq_{wheel} - Tq_{mot}, \text{lower} \right), \text{ where}$$

$\omega_{eng}$=engine speed
$K_{e2m}$=gear ratio between engine and motor
$K_{m2w}$=gear ratio between motor and wheels
$Tq_{wheels}$=torque at wheels
$Tq_{mot}$, upper=upper limit torque of motor
$Tq_{mot}$, lower=lower limit torque of motor
$P_{eng}$, lower=lower limit of engine power region to avoid
$P_{eng}$, upper=upper limit of engine power region to avoid 5. A method for avoiding gear rattle in a powertrain for a hybrid electric vehicle having an engine, a generator and an electric motor and with gearing defining power flow paths from the engine and from the motor to vehicle traction wheels, the method comprising:

establishing a desired engine power and a desired wheel torque;

determining an expected motor torque from the desired engine power and the desired wheel torque;

calculating a motor torque bias and adjusting wheel torque using the motor torque bias, scaled by the gearing ratio between the motor and the traction wheels; and controlling the motor torque and the engine power using a controller based on the motor torque bias and the adjusted wheel torque to avoid gear rattle associated with zero motor torque.

6. A method for avoiding gear rattle in a powertrain for a hybrid electric vehicle with an engine and an electric motor and with gearing defining power flow paths from the engine and from the motor to vehicle traction wheels, the method comprising:

establishing a commanded engine power and a desired wheel torque;

determining an expected motor torque from the commanded engine power and the desired wheel torque;

calculating an engine power bias corresponding to an t expected motor torque of approximately zero;

determining a predicted motor torque from a generator torque command and the desired wheel torque;

determining a motor torque bias and adjusting wheel torque using the motor torque bias, scaled by the gearing ratio between the motor and the traction wheels; and controlling the engine using the engine power bias and controlling the motor using the motor torque bias using at least one controller to avoid gear rattle associated with a powertrain operating condition in which motor torque is near zero.

7. The method set forth in claim 6, wherein expected motor torque is modified by a motor torque bias using a hysteresis strategy as expected motor torque decreases.

8. A method for avoiding gear rattle in a power-split hybrid electric vehicle with an engine, an electric motor, a generator and gearing including a planetary gearset, the planetary gearset having a planetary ring gear connected drivably by the gearing to vehicle traction wheels, the generator being connected drivably to a planetary sun gear, the engine being connected drivably to a planetary carrier, the method comprising:

establishing a desired engine power and a desired wheel torque;

determining an expected motor torque from the desired engine power and the desired wheel torque;

calculating an engine power bias when the desired engine power approaches a value corresponding to the expected motor torque being about zero; and controlling engine power using a controller based on the engine power bias to reduce gear rattle operating conditions.

9. The method set forth in claim 8, wherein the powertrain includes a vehicle system controller for determining an engine speed command for a given engine power command, the engine power bias being removed from the engine power command prior to calculation of a target engine speed command.

10. A method for avoiding gear rattle in a powertrain for a power-split hybrid electric vehicle with an engine, an electric motor, a generator and gearing including a planetary gearset, the planetary gearset having a planetary ring gear connected drivably by the gearing to vehicle traction wheels, the generator being connected drivably to a planetary sun gear, the engine being connected drivably to a planetary carrier, the method comprising:

establishing a desired engine power and a desired wheel torque;

determining an expected motor torque using the desired engine power and the desired wheel torque;

calculating a motor torque bias and adjusting wheel torque using the motor torque bias, scaled by the gearing ratio between the motor and the traction wheels; and controlling the engine and the motor using a controller based on the motor torque bias and the adjusted wheel torque to avoid gear rattle.

11. A method for avoiding gear rattle in a powertrain for a power-split hybrid electric vehicle with an engine, an electric motor, a generator and gearing including a planetary gearset, the planetary gearset having a planetary ring gear connected drivably by the gearing to vehicle traction wheels, the generator being connected drivably to a planetary sun gear, the engine being connected drivably to a planetary carrier, the method comprising:

establishing a desired engine power and a desired wheel torque;

determining an expected motor torque using the desired engine power and the desired wheel torque;

calculating an engine power bias when the desired engine power approaches a value near which the expected motor torque would be approximately zero for a given wheel torque command;

determining a predicted motor torque from a generator torque command and the desired wheel torque;

determining a motor torque bias and adjusting wheel torque using the motor torque bias, scaled by gearing ratios of the motor power flow path; and controlling the engine and the motor using a controller to provide the adjusted wheel torque to avoid a powertrain operating condition associated with gear rattle.

12. The method set forth in claim 11, wherein the engine power bias is removed from an engine power command prior to calculation of a target engine speed command.

13. The method set forth in claim 12 wherein the step of adjusting wheel torque includes using a hysteresis strategy with a calibrated functional relationship between biased motor torque and predicted motor torque in which a torque bias is applied to motor torque when predicted motor torque decreases.

14. The method set forth in claim 11 wherein the step of adjusting wheel torque includes using a hysteresis strategy with a calibrated functional relationship between biased motor torque and predicted motor torque in which a torque bias is applied to motor torque when predicted motor torque decreases.

15. A method for controlling a hybrid vehicle having an engine, traction motor, and generator, comprising:

controlling engine power with a controller using an engine power bias when engine power and generator torque associated with a desired wheel torque result in a predicted traction motor torque of about zero such that adjusted engine power and generator torque correspond to an adjusted traction motor torque that is not about zero to reduce powertrain gear rattle.

* * * * *